UNITED STATES PATENT OFFICE.

RICHARD GAST, OF FECHENHEIM, NEAR FRANKFORT-ON-THE-MAIN, GERMANY, ASSIGNOR TO CASSELLA COLOR COMPANY, OF NEW YORK, N. Y.

NEW COTTON DYESTUFFS AND PROCESS OF MAKING SAME.

1,020,756.     Specification of Letters Patent.     Patented Mar. 19, 1912.

No Drawing.     Application filed June 24, 1910. Serial No. 568,640.

*To all whom it may concern:*

Be it known that I, RICHARD GAST, doctor of philosophy, a subject of the Duchy of Anhalt, in the German Empire, and a resident of Offenbacherlandstrasse 60, Fechenheim, near Frankfort-on-the-Main, Germany, have invented some New Cotton Dyestuffs and a Process of Making Same, of which the following is a full description.

I have discovered that the hitherto unknown formylarylaminonaphthol sulfonic acids may be obtained with ease by boiling the alkaline salts of the arylaminonaphthol sulfonic acids with formic acid.

The new formylarylaminonaphthol sulfonic acids are formed according to the equation

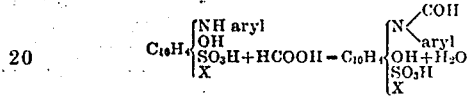

in which X represents a sulfo group or a hydrogen atom. The new acids are distinguished from the starting materials by their greater solubility and by their property not to form nitrosamins. The azo dyestuffs derived from the new acids are distinguished by their brilliant shades and their fastness to acids and light. Their constitution is represented by the general formula

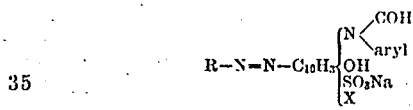

in which R signifies an aromatic radical of the benzene or naphthalene series, X a sulfo group or a hydrogen atom. By reducing agents, such as zinc dust and hydrochloric acid, the azo dyes are split into one molecule of the amin used in the preparation of the dyestuff and into one molecule of the formylaryldiaminonaphthol-sulfonic acid of the formula

in which X signifies a sulfo group or a hydrogen atom.

The production of the new acids and dyestuffs is illustrated by the following examples.

Example I: By heating phenyl-2.5-aminonaphthol-7.sulfonic acid in an aqueous solution with sodium formate the formylphenyl-2.5-aminonaphthol-7-sulfonic acid is formed, according to the equation:

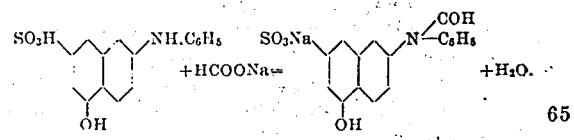

In carrying the invention into effect in practice 94.5 kilos phenyl-2.5-aminonaphthol-7-sulfonic acid are heated to boiling point with 500 kilos 85 per cent. formic acid and 45 kilos formate of soda. Complete solution sets in after a quarter of an hour and the greater part will by then be found to be formylated. Boiling is then continued for another hour and a half and the solution is poured into salt water of 24 degrees Bé. preferably after having distilled off any excess of formic acid. The formyl compound separates as a resin and congeals after some time to a whitish-gray mass which is filtered off and washed with salt water. The yield is almost quantitative.

The sodium salt and the free acid dissolve easily in a little cold water. The sodium salt is soluble in hot alcohol and separates again on cooling. After protracted standing in concentrated cold aqueous solutions it separates in a crystalline form. The formyl acid thus obtained yields e: ially valuable coloring matters if combined with diazoazo compounds.

Example II: The aminoazo body obtained by diazotizing 17.3 kilos sulfanilic acid and coupling with 12.1 kilos p-xylidin is dissolved as a sodium salt, and di tized with 6.9 kilos nitrite of soda and 61 kilos hydrochloric acid. The diazo compound is drawn off by suction, washed, and run into a solution of 36.5 kilos formylphenyl-2.5.7-aminonaphthol sulfonic acid made alkaline by the addition of carbonate of soda. The coupling takes place very soon. After heating to 35° C., the suspended dyestuff is salted out and filtered off. It dissolves in water with a claret-red color which is not changed by the addition of dilute hydrochloric acid, and which dyes cotton a violet shade.

Example III: The aminoazo compound obtained by diazotizing 20.1 kilos m-xylidin-o-sulfonic acid, and coupling with 12.1 kilos p-xylidin is transformed by soda lye into the sodium salt, and diazotized at 0° C. with 6.9 kilos nitrite of soda and 61 kilos hydrochloric acid. This operation being complete, the diazo compound is salted out, filtered off, and washed. It is then run into a solution of 36.5 kilos formylphenyl-2.5.7-aminonaphthol sulfonic acid, charged with an excess of carbonate of soda. The dyestuff separates, is salted out after heating the solution, and filtered off. It dyes cotton violet shades, dissolves in water with a reddish-violet color and this solution is hardly changed by dilute hydrochloric acid.

Example IV: The diazo compound obtained from 31.9 kilos aminonaphthol disulfonic acid 1.8.3.6 is filtered off, washed, and charged with a solution of 13.7 kilos m-aminocresolmethylether in 13 kilos hydrochloric acid. In order to accelerate the coupling, 27 kilos acetate of soda are added. The following day the whole is acidulated with 13 kilos hydrochloric acid, salted out, and filtered off. The aminoazo body obtained in this manner is dissolved with 24 kilos soda lye in 250 liters water, and diazotized with 7.2 kilos nitrite of soda and 61 kilos hydrochloric acid. This diazotizing solution is introduced into a solution of 38.3 kilos sodium salt of the formylphenyl-2.5.7-aminonaphthol sulfonic acid, charged with 64 kilos carbonate of soda. The coupling is complete after a short while. It is then heated to 60° C., precipitated with common salt, and filtered off. The dyestuff dyes cotton reddish-blue shades. It dissolves in water with a purple color which is turned slightly redder by dilute hydrochloric acid.

Having now particularly described and ascertained the nature of my said invention and in what manner the same is to be performed, I declare that what I claim is:—

1. The process of producing azo coloring matters by treating arylaminonaphthol sulfonic acids with formic acid and combining the products thus obtained with diazoazo compounds.

2. The coloring matter derived from a diazoazo compound and formylarylaminonaphtholsulfonic acid 2.5.7 which is easily soluble in water with claret to purple shades dyeing from such solution unmordanted cotton violet to bluish shades, which yields on being reduced by zinc dust and acids formylaryldiaminonaphthol sulfonic acid and which does not react with nitrous acid, substantially as described.

In witness whereof I have hereunto signed my name this 8th day of June 1910, in the presence of two subscribing witnesses.

RICHARD GAST.

Witnesses:
JEAN GRUND,
CARL GRUND.